(12) United States Patent
Yamaki

(10) Patent No.: US 8,132,852 B2
(45) Date of Patent: Mar. 13, 2012

(54) VEHICLE BODY STRUCTURE

(75) Inventor: Jogen Yamaki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 17 days.

(21) Appl. No.: 12/730,545

(22) Filed: Mar. 24, 2010

(65) Prior Publication Data

US 2010/0244486 A1  Sep. 30, 2010

(30) Foreign Application Priority Data

Mar. 25, 2009 (JP) ................................. 2009-074138

(51) Int. Cl.
*B62D 25/20* (2006.01)

(52) U.S. Cl. ......... 296/187.08; 296/187.12; 296/193.07; 296/30; 296/68.1

(58) Field of Classification Search ............... 296/24.34, 296/187.08, 187.12, 193.07, 193.05, 203.03, 296/30, 68.1, 209
See application file for complete search history.

(56) References Cited

U.S. PATENT DOCUMENTS

| | | | | |
|---|---|---|---|---|
| 5,584,525 A * | 12/1996 | Nakano et al. | ............... | 296/68.1 |
| 6,053,567 A * | 4/2000 | Ito | ............... | 296/203.01 |
| 7,104,592 B2 * | 9/2006 | Song | ............... | 296/187.12 |
| 7,328,938 B2 * | 2/2008 | Matsuda | ............... | 296/187.12 |
| 7,540,343 B2 * | 6/2009 | Nakashima et al. | ............... | 180/65.1 |
| 7,600,807 B2 * | 10/2009 | Bachmann | ............... | 296/187.08 |
| 7,854,470 B2 * | 12/2010 | Yamaki et al. | ............... | 296/187.12 |
| 2007/0284914 A1 | 12/2007 | Schiebel et al. | | |
| 2010/0213741 A1 * | 8/2010 | Suzuki et al. | ............... | 296/193.07 |
| 2011/0057477 A1 * | 3/2011 | Yamaki et al. | ............... | 296/187.12 |

FOREIGN PATENT DOCUMENTS

| | | |
|---|---|---|
| JP | 06-255414 | 9/1994 |
| JP | 2000-280937 | 10/2000 |
| JP | 2005-067427 | 3/2005 |
| JP | 2007-320348 | 12/2007 |

* cited by examiner

*Primary Examiner* — Jason S Morrow
(74) *Attorney, Agent, or Firm* — Rankin, Hill & Clark LLP

(57) ABSTRACT

A vehicle body structure includes: a floor tunnel bulging from a center of a floor of a vehicle chamber; a pair of seats flanking the floor tunnel from left and right sides of the floor tunnel; a load receiving member placed on an upper part of the floor tunnel; a left floor cross member extending from a left side of the floor tunnel in the vehicle width direction; and a right floor cross member extending from a right side of the floor tunnel in the vehicle width direction. The load receiving member contacts the seat when the seat receives an impact load from a side of the vehicle body. In addition, the load receiving member transmits the impact load to the floor of the vehicle body. Left and right side rim parts of the load receiving member are connected respectively to the left and right floor cross members.

2 Claims, 3 Drawing Sheets

VEHICLE BODY STRUCTURE

BACKGROUND OF THE INVENTION

The present application claims priority on Japanese Patent Application No. 2009-074138, filed Mar. 25, 2009, the content of which is incorporated herein by reference.

FIELD OF THE INVENTION

The present invention relates to a vehicle body structure which transmits an impact load, entered from a side direction of the vehicle body, to a floor via a seat on which a passenger is seated.

DESCRIPTION OF THE RELATED ART

According to a known vehicle body structure, an impact load, entered to a seat from a side direction of the vehicle body when the vehicle collides laterally, is quickly transmitted to a floor of the vehicle body. This known vehicle body structure is configured so that an impact receiving member is placed on an upper part of a floor tunnel placed between a left seat and a right seat. The impact receiving member comes in contact with a side part of the seat when the vehicle collides laterally. In this way, the impact receiving member transmits the impact load to the floor tunnel. (See, for example, Japanese Unexamined Patent Application, First Publication, No. 2005-67427 (hereinafter referred to as "Patent Document 1").)

According to the vehicle body structure disclosed in Patent Document 1, the impact receiving member includes a console box. The console box is placed on the upper part of the floor tunnel. As a result, when the vehicle collides laterally, the impact load applied to the seat is transmitted to the floor tunnel through the console box.

However, since the above known vehicle body structure is configured so that the impact receiving member is placed on the upper part of the floor tunnel, the impact load entered to the floor tunnel from the seat acts as a large moment to the floor tunnel. Therefore, there is a concern in that the floor tunnel might be distorted and deformed.

SUMMARY OF THE INVENTION

The present invention is made considering the problems described above. Accordingly, an object of the present invention is to provide a vehicle body structure which quickly transmits an impact load, applied to a seat when the vehicle collides laterally, to a floor of the vehicle body without triggering a distortion or a deformation of the floor tunnel.

(1) Namely, a vehicle body structure according to an aspect of the present invention includes a floor tunnel bulging from a center of a floor of a vehicle chamber in a vehicle width direction; a pair of seats flanking the floor tunnel from a left side and a right side of the floor tunnel; a load receiving member placed on an upper part of the floor tunnel; a left floor cross member extending from a left side of the floor tunnel in the vehicle width direction; and a right floor cross member extending from a right side of the floor tunnel in the vehicle width direction. The load receiving member contacts the seat when the seat receives an impact load from a side of the vehicle body. In addition, the load receiving member transmits the impact load to the floor of the vehicle body. Furthermore, a left side rim part of the load receiving member is connected to the left floor cross member. Meanwhile, a right side rim part of the load receiving member is connected to the right floor cross member.

As a result, the left floor cross member and the right floor cross member, which flank the floor tunnel, are connected to the load receiving member. Thus, the left floor cross member and the right floor cross member support the load entered from the seat to the load receiving member when the lateral collision occurs.

(2) In addition, the above vehicle body structure may further include an upper cross member. The upper cross member strides over a peak part of the floor tunnel. The upper cross member also connects the left floor cross member and the right floor cross member. The left side rim part of the load receiving member is connected to the left floor cross member via the upper cross member. In addition, the right side rim part of the load receiving member is connected to the right floor cross member via the upper cross member.

(3) In addition, the above vehicle body structure may be configured as follows: the left side rim part and the right side rim part of the load receiving member are fastened to an upper surface of the upper cross member.

According to the vehicle body structure described in (1) above, the left floor cross member and the right floor cross member support the load entered from the seat to the load receiving member when a lateral collision occurs. Thus, it is possible to reduce the amount of load which is entered directly to the floor tunnel from the load receiving member. Therefore, the floor tunnel is prevented from distorting or deforming. In addition, the load entered to the seat can be quickly transmitted to the floor of the vehicle body.

According to the vehicle body structure described in (2) above, the left side rim part and the right side rim part of the load receiving member are linked to the left floor cross member and the right floor cross member via the upper cross member. Thus, the length of protrusion of the left side rim part and the right side rim part of the load receiving member can be shortened. At the same time, the upper cross member can further enhance the rigidity of the connecting portion between the left floor cross member and the right floor cross member.

According to the vehicle body structure described in (3) above, the left side rim part and the right side rim part of the load receiving member are fastened to the upper surface of the upper cross member. As a result, the fastening operation can be conducted easily from the upper and lower directions. In this way, the operability of assembling the vehicle body structure can be improved.

DETAILED DESCRIPTION OF THE PREFERRED EMBODIMENTS

Hereunder, a first embodiment of the present invention is described with reference to FIGS. 1-3.

Figure 1:
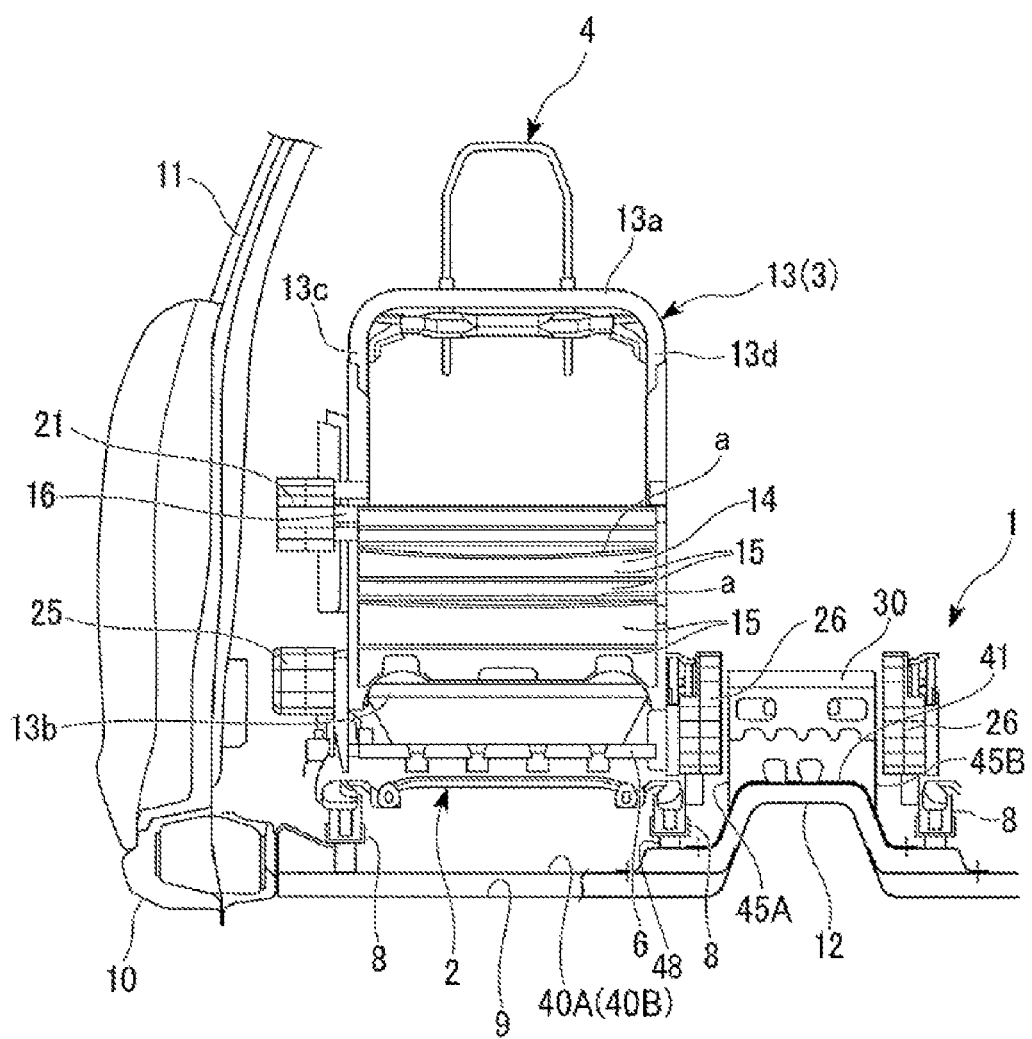
FIG. 1 is a cross sectional view of a vehicle according to an aspect of the present invention.

FIG. 1 is a diagram of a left seat 1 and a right seat 1 at a front row of a vehicle seen from a back side. FIG. 1 is drawn so as to show only a skeletal member of seat 1. In addition, only a portion of the right seat 1 is shown.

The seat 1 includes a seat cushion 2 which supports a bottom of a passenger, a seat back 3 which is linked to a rear end part of the seat cushion 2 and supports a hip and a chest (a back) of the passenger, and a head rest 4 which is supported by an upper part of the seat back 3 and supports a head and a neck of the passenger.

The seat cushion 2 includes a cushion frame at a rear end part of the seat cushion 2. A rear part cross member 6 is fastened to the cushion frame. The rear part cross member 6 extends along the vehicle width direction. This cushion frame is provided on a vehicle body floor 9 via a seat rail 8, 8 so that the cushion frame can slide in the front-rear direction. Incidentally, reference numeral 10 in the diagram indicates a side sill provided on a lower end side part of the vehicle body. Reference numeral 11 indicates a center pillar which is provided at approximately a center of a side part of the vehicle body. Reference numeral 12 is a floor tunnel formed so as to expand upwards at a central region in a vehicle width direction on the vehicle body floor 9. A console box 30 (a load receiving part) is fixed between the left seat 1 and the right seat 1 in a front row on the floor tunnel 12. A storage part 30*a* (see FIG. 2) is provided at an upper surface side of the console box 30.

The seat back 3 includes a seat back frame 13 which is shaped approximately like a rectangular frame. The seat back frame 13 includes an upper frame 13*a*, a left side frame 13*c*, a right side frame 13*d*, and a lower connecting plate 13*b*. A lower end of the seat back frame 13 is hinge-connected to a rear end part of the cushion frame so that the seat back frame 13 can tilt. A supporting frame of the head rest 4 is provided at a central location in the width direction of the upper part frame 13*a* of the seat back frame 13, so that the supporting frame of the head rest 4 can be elevated and lowered.

A plate member 14 is provided on a back side of the seat back frame 13. The plate member 14 is approximately rectangular as seen from a frontal view.

The plate member 14 includes a plurality of concave and convex parts 15. A ridge part a of the concave and convex parts 15 extends in the vehicle width direction. A wave-shaped cross section, formed by the concave and convex parts 15, extends continuously in the longitudinal direction of the vehicle body. A left side rim and a right side rim of the plate member 14 are connected to the left side frame 13*c* and the right side frame 13*d*. The height of an upper end part of the plate member 14 is set to be approximately equal to the height of the chest of the passenger sitting on the seat 1.

Figure 2:
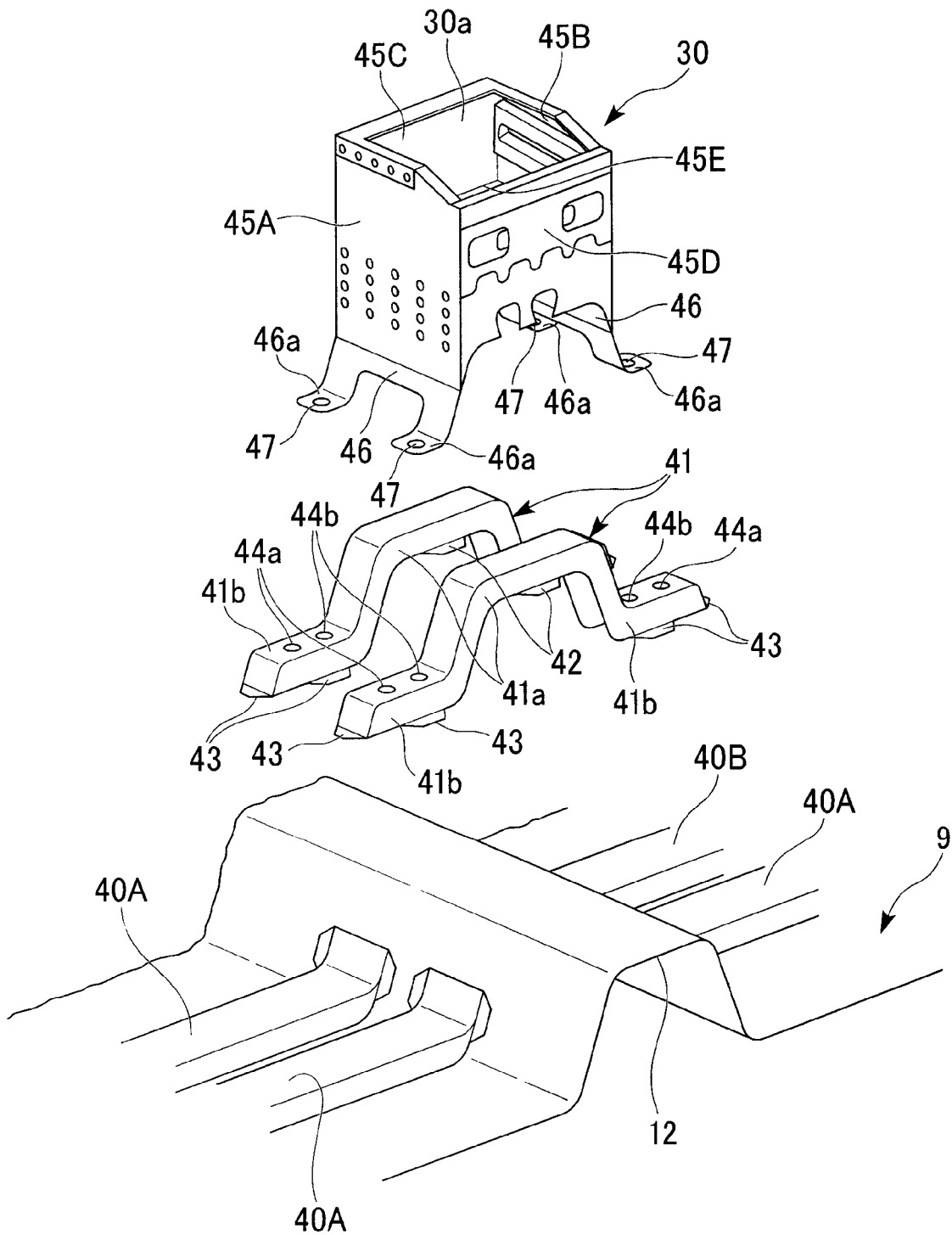
FIG. 2 is an exploded perspective view showing a vehicle body structure of a vehicle according to an aspect of the present invention.

FIG. 2 is an exploded perspective view showing a structure of a floor 9 area of a vehicle chamber between the left seat 1 and the right seat 1.

As shown in FIGS. 1 and 2, a pair of floor cross members 40A and 40B is provided in the left and right sides of the floor tunnel 12. The floor cross members 40A and 40B extend in the vehicle width direction. The cross-section of each of the cross members 40A and 40B is channel shaped. The pair of floor cross members 40A and 40B is divided into two groups, i.e., a group located at a front end part of the seats 1, 1 on the vehicle body floor 9, and another group located at a rear end part of the seats 1, 1 on the vehicle body floor 9. In addition, both end parts of the floor cross members 40A and 40B are connected to the floor tunnel 9 and the side sill 10.

The rim parts of the pair of floor cross members 40A, 40B positioned toward the center part of the vehicle body are connected with an upper cross member 41. The upper cross member 41 strides over a peak portion of the floor tunnel 12 along the vehicle width direction. The cross section of the upper cross member 41 is channel shaped. A central region 41*a* of the upper cross member 41 in the longitudinal direction curves upwards along an external shape of the floor tunnel 12. Both sides of the side rim part 41*b* in the longitudinal direction extend approximately horizontally. Connection flanges 42, 43 are provided as an extension of the central region 41*a* and the side rim part 41*b*. The connection flange 42 of the central region 41*a* connects to an upper surface of the peak part of the floor tunnel 12. The connection flange 43 of the side rim part 41*b* connects to an upper surface of the floor cross members 40A, 40B. In addition, bolt insertion holes 44*a*, 44*b* are provided on an upper surface of each side rim part 41*b* along the vehicle width direction. A weld-nut (not diagramed) is provided on a back side of each side rim part 41. A bolt (not diagramed), which is inserted to the bolt insertion holes 44*a* and 44*b*, are screwed into the weld-nut.

On the other hand, the console box 30 includes side walls 45A, 45B, a front wall 45C, a rear wall 45D, and a bottom wall 45E. The interior of the bottom wall 45E is reinforced by a plurality of frame parts and the like. An upper side of the bottom wall 45E is the storage part 30*a*. An extension wall 46 is provided on the lower rim of both side walls 45A, 45B. The extension wall 46 extends along an external surface of the floor tunnel 12. A pair of fastening chips 46*a*, 46*a* is provided on a lower end of the extension wall 46 as an extension to the lower end. The fastening chips 46*a*, 46*a* bend in an approximately horizontal direction. A bolt insertion hole 47 is provided on each of the fastening chips 46*a*. Each fastening chip 46*a* is stacked to an upper surface of the side rim part 41*b* of the upper cross member 41. In this condition, the fastening chip 46*a* is bolt-fastened to the side rim part 41*b* from the upper side.

Here, each fastening chip 46*a* of the console box 30 is bolt-fastened to a bolt insertion hole 44*b* positioned toward the central part of the side rim part 41*b* of the upper cross member 41. Meanwhile, a leg part 48, provided in the inner side of the seat 1 in the vehicle width direction, is bolt-connected to a bolt insertion hole 44*a* located towards the outer side of the side rim part 41*b*.

Incidentally, as shown in FIG. 1, a load transmission block 21 is provided on a position corresponding to an upper end part of a plate member 14 of the side frame 13*c*. The load transmission block 21 protrudes from a side part of the seat back frame 13 towards the outer side in the vehicle width direction. When an impact load is entered from a side of the vehicle body, the load transmission block 21 transmits the load to the side frame 13*c* and the plate member 14. The load transmission block 21 is formed as a honeycomb structure including a plurality of cylindrical parts extending along the vehicle width direction and positioned in parallel. Overall, the load transmission block 21 comprises resin, and is shaped as a parallelepiped elongated in the longitudinal direction.

The lower edge parts of the left side frame 13*c* and the right side frame 13*d* are connected with a lower cross member (not diagrammed). The lower cross member surrounds a hinge shaft which rotatably links the seat cushion 2 and a seat back 3. The load transmission block 25 is provided on an external side surface of the side frame 13*c* in the vehicle width direction positioned along an extension of the lower cross member. The load transmission block 26 is provided on an inner side surface of the side frame 13*d* in the vehicle width direction positioned along an extension of the lower cross member. Similar to the load transmission block 21, each of the load transmission blocks 25, 26 is formed as a honeycomb structure including a plurality of cylindrical parts extending along the vehicle width direction and positioned in parallel. Further, the load transmission block 26 toward the side frame 13*d* faces the side walls 45A, 45B of the console box 30 at a central portion in the vehicle width direction.

According to the configuration described above, when an impact load is entered from a side of the vehicle, and a side wall of the vehicle body such as a center pillar 11 and the like deforms in the direction of the seat back 3, the load from the side wall is transmitted to the side frame 13c via at least one of the upper and lower load transmission blocks 21, 25.

When an impact load is entered to the lower impact transmission block 25, the entire seat moves towards the inner side in the vehicle width direction. At the same time, the impact transmission block 26, provided at the inner lower side in the vehicle width direction, comes in contact with the console box 30. At this time, the load is transmitted from the lower cross member, positioned below the seat back frame 13, to the console box 30 via the load transmission block 26.

Furthermore, when an impact load is entered to the upper load transmission block 21, the load is transmitted from the load transmission block 21 to the side frame 13c. The load is then transmitted to the side frame 13d at the inner side in the vehicle width direction, via the plate member 14 connected to a rear surface side of the side frame 13 and an upper and lower framework of the seat back frame 13 (i.e., the upper frame 13a and the lower connecting plate 13b). At this time, when an impact load enters from the side frame 13c to an upper end part of the plate member 14, a stress is created in the shear direction at a plurality of regions divided by the ridge part a of each concave and convex parts 15 of the plate member 14. Thus, the impact load which was entered is received by roughly the entire plate member 14.

In this way, as the impact load is transmitted so as to be dispersed to the entire seat back frame 13, the entire seat moves towards the inner side in the vehicle width direction. At the same time, the load transmission block 26 comes in contact with the console box 30. The load is thus transmitted from the load transmission block 26 to the console box 30.

Figure 3:
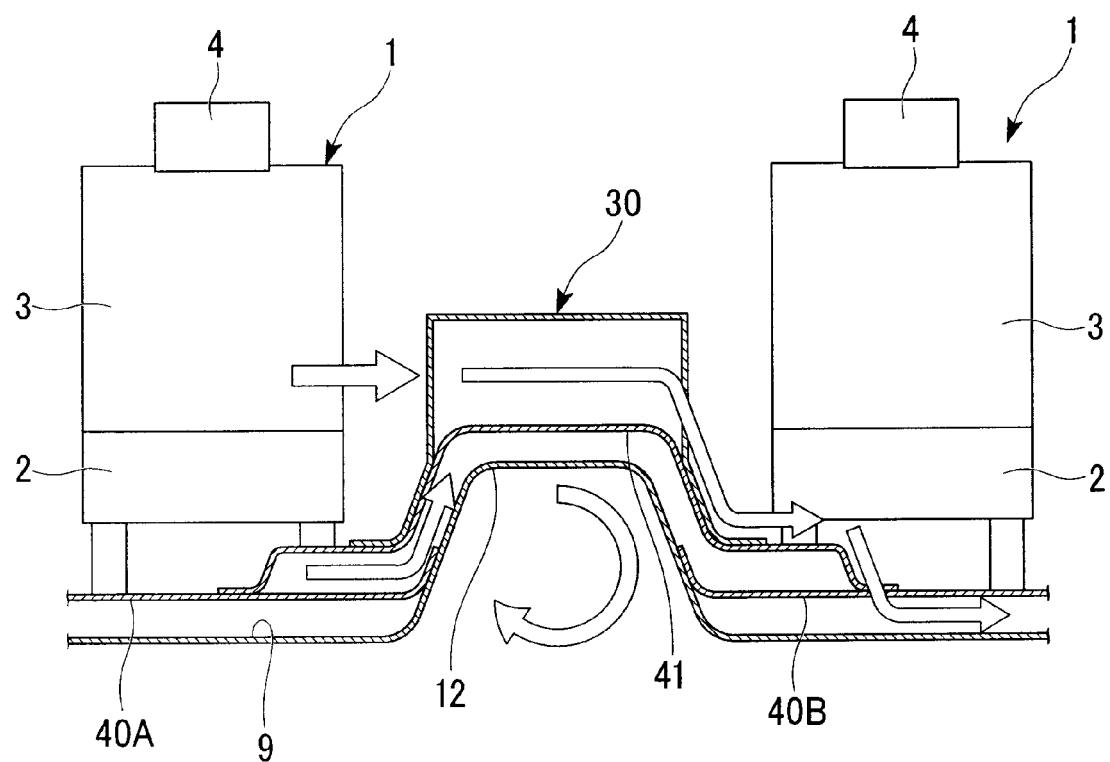
FIG. 3 is a schematic cross sectional diagram of a vehicle according to an aspect of the present invention.

FIG. 3 is a diagram showing a model of how the impact load is transmitted at the time of a lateral collision. In FIG. 3, the impact transmission blocks 21, 25, and 26, and the like, of each seat 1 are not diagramed.

As shown in FIG. 3, when an impact load is transmitted from the seat 1 to the side surface of the console box 30, the load is transmitted to the left floor cross member 40A and the right floor cross member 40B via the upper cross member 41. Thus, the left floor cross member 40A and the right floor cross member 40B support the moment applying in a direction toward which the console box 30 tilts. Therefore, the impact load entered from the seat 1 to the console box 30 is received by the left floor cross member 40A and the right floor cross member 40B.

As described above, according to the vehicle body structure based on the present invention, the console box 30, which is a load receiving member, is connected to the left floor cross member 40A and the right floor cross member 40B while striding over the floor tunnel 12. Thus, the impact load, transmitted from the seat 1 to the console box 30 at the time of a lateral collision, can be dispersed and supported by the left floor cross member 40A and the right floor cross member 40B. In this way, the amount of load which enters directly to the exploded part of the floor tunnel 12 can be reduced. Therefore, the impact load entered to the seat 1 can be quickly transmitted to the vehicle body floor 9 without causing a distortion or a deformation of the floor tunnel 12.

In addition, according to the above vehicle body structure, an upper cross member 41 is provided, which strides over the floor tunnel 12 and connects the left floor cross member 40A and the right floor cross member 40B. The cross section of the upper cross member is closed. Each extension wall 46 at both sides of the console box 30 is bolt-fastened to the side rim part 41b of this upper cross member 41. Thus, the length of the extension wall 46 can be shortened. In addition, the support strength of the console box 30 can be enhanced. At the same time, the upper cross member 41 can further enhance the rigidity of the connecting part between the left floor cross member 40A and the right floor cross member 40B.

Furthermore, according to the above embodiment of the present invention, the extension wall 46 of the console box 30 is bolt-fastened to an upper surface of the side rim part 41b of the upper cross member 41. As a result, the console box 30 can be easily bolt-fastened during a process of assembling the vehicle. Therefore, the vehicle body structure according to the present invention can enhance the operability of the assembling process.

While a preferred embodiment of the present invention has been described above, it should be understood that these are exemplary of the invention and are not to be considered as limiting the present invention. Additions, omissions, substitutions, and other modifications can be made without departing from the scope of the present invention. The invention is not to be considered as being limited by the foregoing description, and is only limited by the scope of the appended claims.

What is claimed is:

1. A vehicle body structure comprising:
   a floor tunnel bulging from a center of a floor of a vehicle chamber in a vehicle width direction;
   a pair of seats flanking the floor tunnel from a left side and a right side of the floor tunnel;
   a load receiving member placed on an upper part of the floor tunnel;
   a left floor cross member extending from a left side of the floor tunnel in the vehicle width direction;
   a right floor cross member extending from a right side of the floor tunnel in the vehicle width direction, and
   an upper cross member striding over a peak part of the floor tunnel and connecting the left floor cross member and the right floor cross member, wherein
   the load receiving member contacts the seat when the seat receives an impact load from a side of the vehicle body, and the load receiving member transmits the impact load to the floor of the vehicle body;
   a left side rim part of the load receiving member is connected to the left floor cross member;
   a right side rim part of the load receiving member is connected to the right floor cross member;
   the left side rim part of the load receiving member is connected to the left floor cross member via the upper cross member; and
   the right side rim part of the load receiving member is connected to the right floor cross member via the upper cross member.

2. A vehicle body structure comprising:
   a floor tunnel bulging from a center of a floor of a vehicle chamber in a vehicle width direction;
   a pair of seats flanking the floor tunnel from a left side and a right side of the floor tunnel;
   a load receiving member placed on an upper part of the floor tunnel;
   a left floor cross member extending from a left side of the floor tunnel in the vehicle width direction;
   a right floor cross member extending from a right side of the floor tunnel in the vehicle width direction, and
   an upper cross member striding over a peak part of the floor tunnel and connecting the left floor cross member and the right floor cross member, wherein
   the load receiving member contacts the seat when the seat receives an impact load from a side of the vehicle body, and the load receiving member transmits the impact load to the floor of the vehicle body;

a left side rim part of the load receiving member is connected to the left floor cross member;

a right side rim part of the load receiving member is connected to the right floor cross member;

the left side rim part of the load receiving member is connected to the left floor cross member via the upper cross member;

the right side rim part of the load receiving member is connected to the right floor cross member via the upper cross member; and the left side rim part and the right side rim part of the load receiving member are fastened to an upper surface of the upper cross member.

* * * * *